United States Patent [19]
Kelly

[11] Patent Number: 5,910,376
[45] Date of Patent: Jun. 8, 1999

[54] HARDFACING OF GAMMA TITANIUM ALUMINIDES

[75] Inventor: Thomas J. Kelly, Cincinnati, Ohio

[73] Assignee: General Electric Company, Cincinnati, Ohio

[21] Appl. No.: 08/775,649

[22] Filed: Dec. 31, 1996

[51] Int. Cl.$^6$ .............. B32B 1/06; B32B 15/16; B23K 35/12; B23K 35/32

[52] U.S. Cl. ............. 428/558; 428/660; 75/252; 75/254

[58] Field of Search .................. 428/660, 627, 428/558, 560, 636; 75/254, 252; 219/146.22, 146.32, 146.51

[56] References Cited

U.S. PATENT DOCUMENTS

| | | | |
|---|---|---|---|
| 3,802,850 | 4/1974 | Clougherty | 29/182.2 |
| 3,915,693 | 10/1975 | Rasmussen | 75/53 |
| 4,761,346 | 8/1988 | Naik | 428/627 |
| 4,800,131 | 1/1989 | Marshall et al. | 428/558 |
| 4,847,044 | 7/1989 | Ghosh | 419/8 |
| 4,906,430 | 3/1990 | Abkowitz et al. | 419/6 |
| 4,915,903 | 4/1990 | Brupbacher et al. | 420/129 |
| 4,968,348 | 11/1990 | Abkowitz et al. | 75/244 |
| 4,987,033 | 1/1991 | Abkowitz et al. | 428/469 |
| 5,015,534 | 5/1991 | Kampe et al. | 428/570 |
| 5,059,490 | 10/1991 | Brupbacher et al. | 428/614 |
| 5,068,003 | 11/1991 | Takahashi et al. | 148/421 |
| 5,093,148 | 3/1992 | Christodoulou et al. | 427/37 |
| 5,397,533 | 3/1995 | Morikawa et al. | 420/418 |
| 5,453,243 | 9/1995 | Hansen et al. | 419/45 |
| 5,525,779 | 6/1996 | Santella et al. | 219/137 WM |
| 5,724,643 | 3/1998 | Ewing | 419/8 |

*Primary Examiner*—John J. Zimmerman
*Attorney, Agent, or Firm*—Andrew C. Hess; David L. Narciso

[57] ABSTRACT

A gamma titanium aluminide substrate is hardfaced by providing a hardfacing material with a titanium-aluminum, gamma-titanium aluminide alloy component having a composition of titanium and about 42 to about 49 atomic percent aluminum, and a nonmetallic powder, such as titanium diboride. This hardfacing material is preferably furnished as a hardfacing alloy source in the form of a hollow tube of metallic titanium tube material, and a filler powder within the hollow tube. The filler powder is a filler mixture of an aluminum-containing alloy powder comprising more than about 50 atomic percent aluminum, and the nonmetallic powder. The relative proportions of the titanium tube material and the aluminum-containing alloy powder are such that their net composition is a gamma phase titanium aluminide composition. The hardfacing material is applied to the substrate, as by a welding process.

12 Claims, 3 Drawing Sheets

HARDFACING OF GAMMA TITANIUM ALUMINIDES

BACKGROUND OF THE INVENTION

This invention relates to the formation of a hard, wear-resistant surface on a gamma titanium aluminide alloy.

Titanium aluminides are a class of alloys whose compositions include at least titanium and aluminum, and typically some additional alloying elements such as chromium, niobium, vanadium, tantalum, manganese, or and/boron. The gamma titanium aluminides are based on the gamma phase found at nearly the equiatomic composition, with roughly 50 atomic percent each of titanium and aluminum, or slightly reduced amounts to permit the incorporation of other alloying elements. The titanium aluminides, and particularly the gamma titanium aluminides, have the advantages of low density, good low and intermediate temperature strength and cyclic deformation resistance, and good environmental resistance.

Gamma titanium aluminides can be used in aircraft engines. They potentially have applications such as low-pressure turbine blades and vanes, bearing supports, compressor casings, high pressure and low pressure hangars, frames, and low pressure turbine brush seal supports. They may also have application in other products such as automotive valves and superchargers.

The gamma titanium aluminides are not noted as having a high resistance to erosion damage. For some applications of gamma titanium aluminides, the inventor has recognized that it would be desirable to provide a hardfacing on the gamma titanium aluminide component substrate. Available hardfacing materials, however, are chemically and/or physically not compatible with the gamma titanium aluminides. Hardfacing materials based upon iron, cobalt, or nickel alloys chemically react and interdiffuse with the titanium to form undesirable reaction products such as brittle intermetallic phases, they are dense, thereby adding unnecessarily to the weight of the hardfaced component, and they have significantly different thermal expansion coefficients, leading to separation of the hardfacing from the substrate during service. Those hardfacing alloys based upon titanium compositions have insufficient thermal resistance and performance at elevated temperatures, and also have different thermal expansion coefficients.

There is, accordingly, a need for an improved approach to the hardfacing of gamma titanium aluminides. The present invention fulfills this need, and further provides related advantages.

SUMMARY OF THE INVENTION

The present invention provides a hardfacing material for gamma titanium aluminides, a convenient source for the hardfacing material, and a method for hardfacing the gamma titanium aluminides either during manufacture or as a field repair. The hardfacing material is chemically and physically compatible with the gamma titanium aluminides. It provides good hardfacing performance.

In accordance with the invention, a hardfacing material comprises a mixture of a titanium-aluminum, gamma titanium aluminide alloy component comprising from about 42 to about 49 atomic percent aluminum, balance titanium, and a nonmetallic powder. The titanium-aluminum alloy component is itself a gamma titanium aluminide, so that it is chemically and physically matched to the substrate to which it is applied. The nonmetallic powder, which preferably constitutes from about 10 to about 50 volume percent of the total volume of the hardfacing material, is preferably a titanium-containing nonmetallic compound such as titanium diboride or titanium carbide.

The hardfacing material is preferably provided as a hardfacing alloy source comprising a hollow tube of metallic titanium tube material, and a filler powder within the hollow tube. The filler powder comprises a filler mixture of a high-aluminum powder comprising more than about 50 atomic percent aluminum, balance alloying elements, and a nonmetallic compound powder. The relative proportions of the titanium tube material and the filler mixture are such that their net composition is a gamma-phase titanium aluminide composition, preferably about the same composition as the substrate to which the hardfacing is subsequently applied. The hardfacing material may also be provided as a powder form (i.e., not in a tube) whose composition is that desired for the hardfacing layer.

The hardfacing material is applied to the surface of the gamma titanium aluminide substrate by any operable technique. When the hardfacing material is provided as the hardfacing alloy source, the application is preferably by welding. When the hardfacing material is in a fully powdered form, the application is preferably by spraying. In either case, the result of application is a hardfacing layer overlying and bonded to the surface of the gamma titanium aluminide substrate.

The present invention provides a hardfacing material, a convenient source, and a method of application to a gamma titanium aluminide substrate. The hardfacing can be applied generally over the surface of the substrate or only in selected areas where erosion resistance and hardness are particularly required. The hardfacing may be either thin or thick, with thicker deposits preferably prepared as a series of overlying thin layers. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
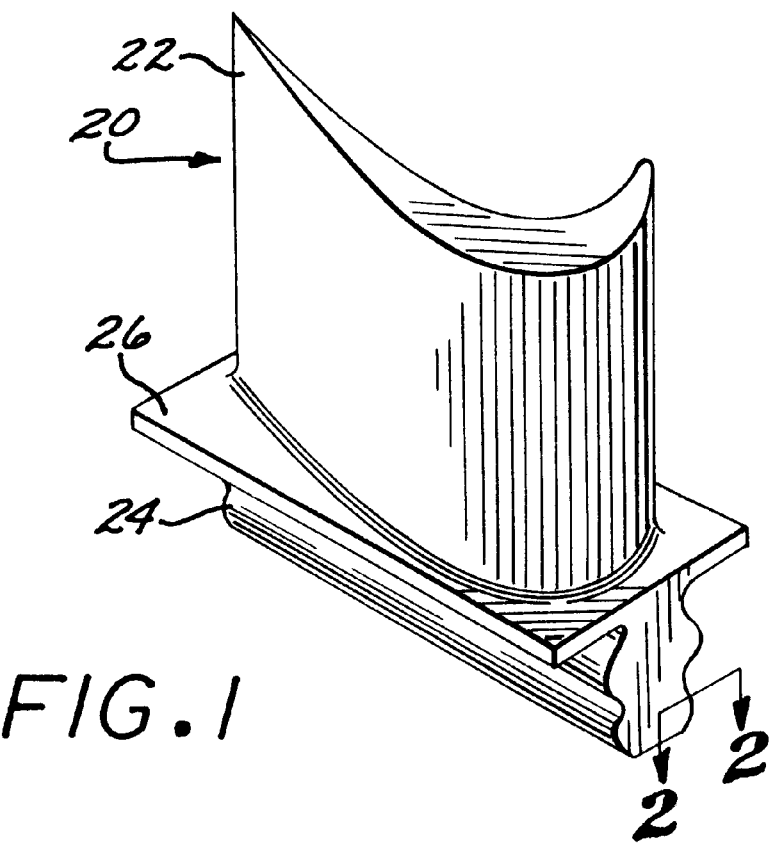
FIG. 1 is a perspective view of a gas turbine article having a hardfacing thereon.

FIG. 1 depicts a component of a gas turbine engine such as a turbine blade or turbine vane, and in this case a low-pressure turbine blade 20 made of a gamma titanium aluminide alloy. Components of other systems such as, for example, automotive valves and superchargers may also be made of gamma titanium aluminide alloys. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24.

As used herein, "gamma titanium aluminide" articles are those having compositions capable of forming the gamma (γ) titanium aluminide phase found generally at, slightly below, and slightly above the equiatomic composition in the titanium-aluminum system, and found also in titanium-aluminum-X systems. (All compositions herein are stated in atomic percent unless indicated otherwise.) Although the gamma titanium aluminide composition is based upon the titanium-aluminum system, alloying additions X (such as chromium and niobium) are provided in some gamma titanium aluminide alloys to modify and improve the properties for specific applications, and are acceptable herein. The gamma titanium aluminide alloys of most interest are multiphase alloys containing predominantly gamma phase, but which may contain other phases such as alpha-two (α2) and/or beta-two (β2) phases. Such alloys typically have from about 42 to about 49 atomic percent aluminum, balance titanium and, optionally, other alloying elements. However, the gamma phase field extends up to about 70 atomic percent aluminum, and such alloys are also considered gamma titanium aluminides for the present purposes.

Figure 2:
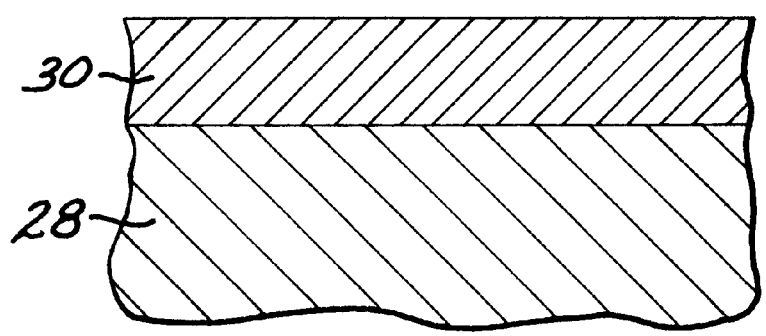
FIG. 2 is a sectional view through the article of FIG. 1, taken generally along line 2—2.

FIG. 2 is a section through the turbine blade 20, showing the gamma titanium aluminide substrate 28 and a layer of hardfacing material 30 applied thereon and bonded thereto. The hardfacing layer 30 is typically from about 0.020 inches to about 0.060 inches thick, although these dimensions are not critical.

Figure 3:
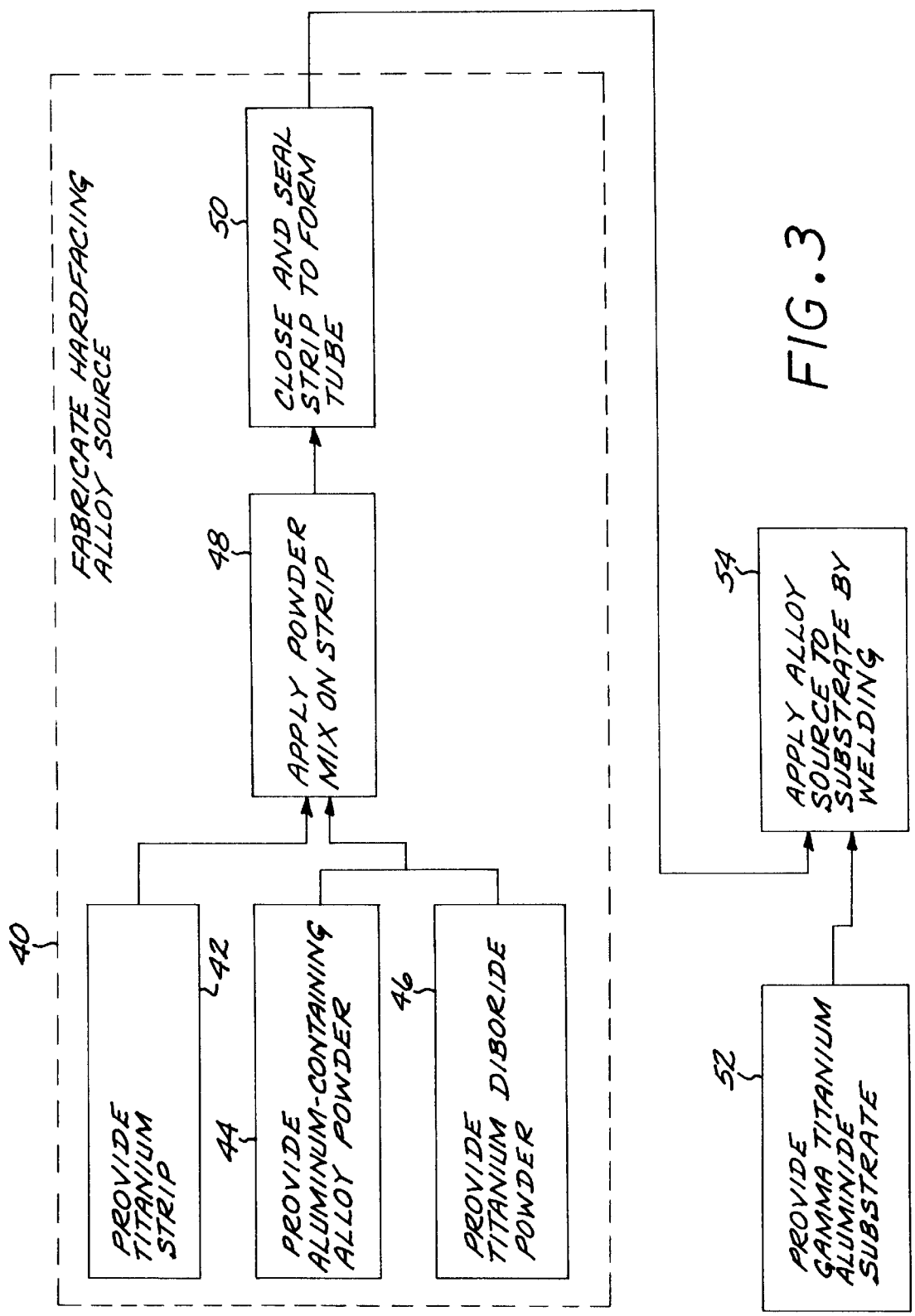
FIG. 3 is a block diagram of a first embodiment of the approach of the invention.

FIG. 3 is a block flow diagram for practicing a first preferred embodiment of the invention. A hardfacing alloy source is first fabricated, numeral 40. This hardfacing alloy source is in the form of a weld rod. To fabricate the alloy source, a strip of titanium is first provided, numeral 42. As used herein, the "titanium" strip may be pure titanium or a titanium alloy. If the strip is a titanium alloy, the alloy must be a relatively ductile alloy that permits the bending and closing of the strip as discussed subsequently.

An aluminum-containing alloy metallic powder is provided, numeral 44. As used herein, the "aluminum-containing" alloy powder may also, and typically does, include other alloying elements, as discussed below. This powder preferably has more than about 50 atomic percent aluminum, and most preferably has from about 50 to about 90 atomic percent aluminum.

The compositions and relative amounts of the titanium strip and the aluminum-containing alloy powder are cooperatively selected such that their net composition is approximately that of the gamma titanium aluminide substrate 28 to which the hardfacing 30 is applied. For example, if the nominal composition of the gamma titanium aluminide substrate 28 is 46 atomic percent aluminum, 2 atomic percent chromium, 2 atomic percent niobium, balance titanium, the net composition of titanium strip and the aluminum-containing alloy powder is preferably of about this same composition. The net composition is determined by a weighted average of the compositions of the titanium strip and the aluminum-containing alloy powder, the weighting being the relative amount of each. The net composition need not be exactly the same as that of the substrate, but it should, and preferably must, be within the range of compositions which form gamma titanium aluminides. Achieving a net composition of a gamma titanium aluminide, and preferably about that of the substrate, ensures chemical compatibility so that diffusional phases such as brittle phases are not formed during service, and ensures that the substrate is not diffusionally depleted of key alloying ingredients during elevated temperature exposure in service. It also ensures a relatively good match of thermal expansion coefficient between the substrate and the hardfacing, and ensures that there will not be different phase transformations occurring in the substrate and the hardfacing when the temperature is changed in service.

A nonmetallic powder is provided, numeral 46. The nonmetallic powder is preferably of a titanium nonmetallic composition, and most preferably is titanium diboride ($TiB_2$). Other titanium-containing nonmetallic powders such as titanium carbide (TiC) may also be used. The amount of the nonmetallic powder is preferably from about 10 to about 50 (preferably from about 10 to about 20) volume percent of the total of the titanium strip, the aluminum-containing alloy powder, and the nonmetallic powder (i.e., from about 10 to about 50 volume percent of the hardfacing layer 30). If the amount is lower than about 10 volume percent, there is little if any beneficial effect of its presence in providing a hard, wear-resistant surface. If the amount is more than about 50 volume percent, it may be difficult to bind the nonmetallic powder into the hardfacing material matrix formed by the material of the titanium strip and the aluminum-containing powder when they are later melted together, and thence difficult to adhere the hardfacing material to the substrate.

The powders need not be extremely finely divided. Small chunks of the ingredients are operable. In the case of the aluminum-containing alloy powder, there may be several powders mixed together to provide the net metallic alloy powder composition. It is preferred that the aluminum-containing alloy powders be prealloyed, however, to avoid adverse reactions during subsequent melting and weld application.

The aluminum-containing metallic alloy powder may be premixed or preformed with the nonmetallic powder (i.e., combining steps 44 and 46), or supplied separately. In all cases, the nonmetallic powder does not melt and dissolve into the metallic alloy powder, but instead remains as a separate component.

The powders provided in steps 44 and 46 are mixed together and then placed onto the upper surface of the titanium strip, numeral 48. To facilitate the application, the strip is preferably previously bent to a "U" shape, and the powder mixture is placed into the interior of the U-shaped strip. The amount of the powder mixture per length of strip is determined as discussed previously.

Figure 4:
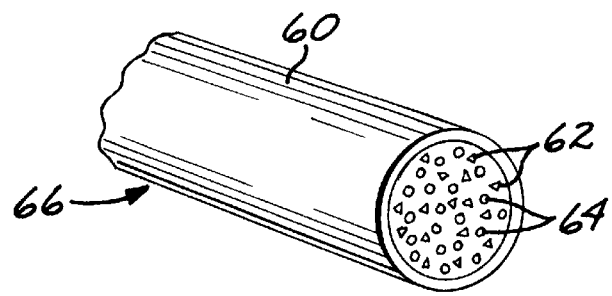
FIG. 4 is a partially perspective, partially sectional view of a hardfacing alloy source useful in the approach of FIG. 3.

The sides of the titanium strip are bent together and closed by any operable technique, numeral 50, such as a crimp, a pressure weld, or a thermal weld. The result is shown in FIG. 4. The titanium strip forms a hollow tube 60 with the aluminum-containing alloy powder 62 and the titanium diboride powder 64 therein. The ends of the tube 60 are typically closed by any operable technique, such as a crimp, a pressure weld, or a thermal weld, to retain the powders therein. The tube 60 may also be drawn or extruded to a somewhat smaller external dimension to compact the powders therein. This completes the preparation of a hardfacing alloy source 66.

This general approach to the making of hardfacing alloy sources is known in the art for other applications but not, to the inventor's knowledge, for the fabrication of a hardfacing source like that of the present invention for use in hardfacing of gamma titanium aluminide articles.

A gamma titanium aluminide article substrate is provided, numeral 52. The material of the hardfacing alloy source 66 is applied to any area of the substrate that is desirably hardfaced, numeral 54. The application is preferably by welding. In this type of welding, a torch is used to heat the substrate and simultaneously melt a length of the hardfacing alloy source so that the melted mixture is deposited upon the surface of the substrate. Upon cooling, the melted mixture bonds to and adheres to the surface of the substrate 28 as the hardfacing layer 30. The welding may be by hand or using an automated welding machine. The hardfacing 30 may be applied as a single layer of selectable thickness or as several overlying layers. A single layer is preferably from about 0.015 inches to about 0.020 inches thick. If a thicker hardfacing is required, it is preferred to successively apply several thinner overlying layers to produce the thicker layer.

Thus, in this welding approach there are initially three components to the hardfacing material: the titanium tube, the aluminum-containing powder, and the nonmetallic powder. The titanium tube and the aluminum-containing powder within the tube melt together during application to have a net composition of a gamma titanium aluminide, and preferably the same composition as the substrate. The nonmetallic powder of a hard phase is not melted, but remains as a separate component in the hardfacing layer to improve the wear and erosion resistance of the hardfacing layer.

Figure 5:
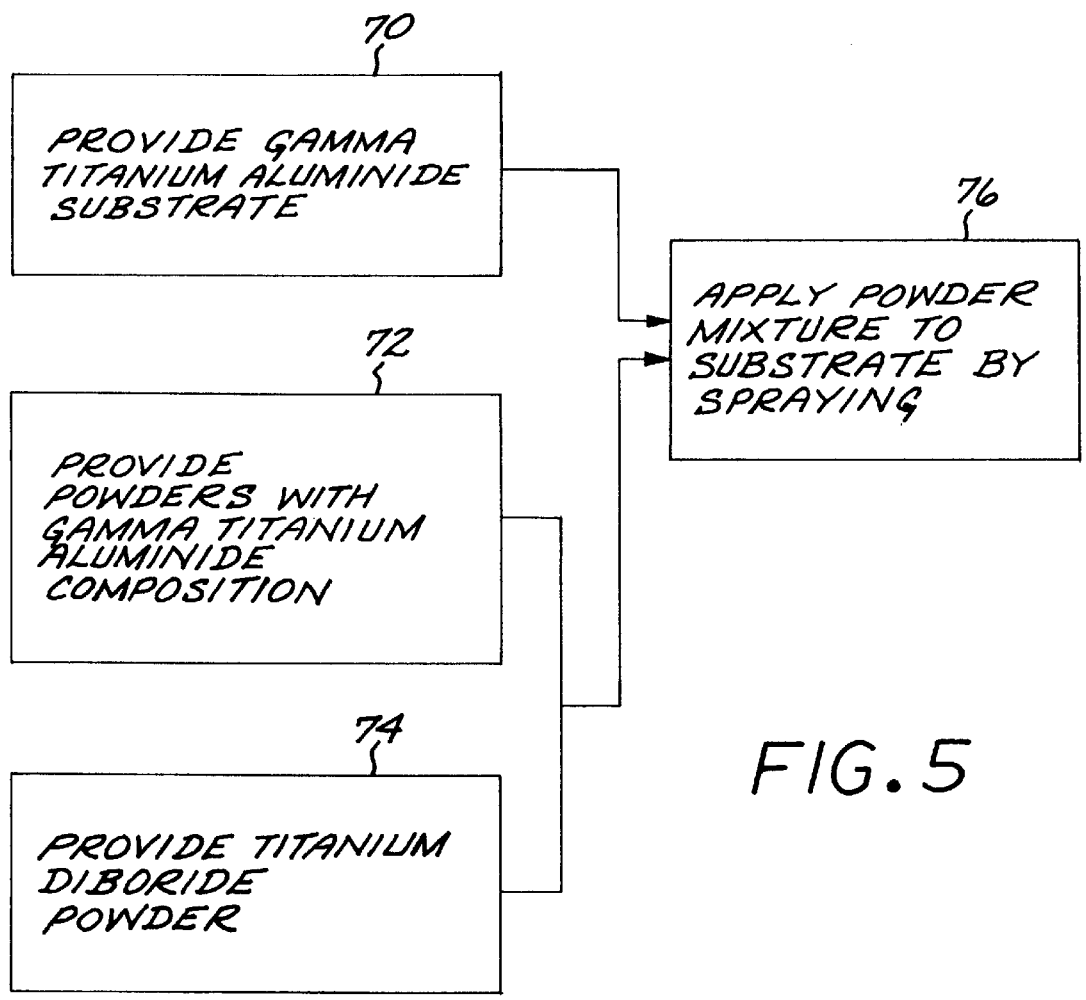
FIG. 5 is a block diagram of a second embodiment of the approach of the invention.

FIG. 5 depicts another approach for practicing the invention. In this approach, the titanium aluminide substrate 28 is provided, numeral 70. One or more aluminum-containing alloy powders whose net composition is a gamma titanium aluminide, preferably about the same composition as the substrate, are provided, numeral 72. The nonmetallic powder, preferably titanium diboride powder, is provided, numeral 74. The nonmetallic powder is preferably present in an amount of from about 10 to about 50 volume percent of the total of the aluminum-containing alloy powder and the nonmetallic powder, as discussed previously.

These powders are mixed together and applied to the substrate 28, numeral 76, as the hardfacing 30. In this case, welding application is difficult because the powders are loose. Instead, it is preferred that the powders be applied by a spray technique such as plasma arc spraying, but any operable approach may be used as long as the nonmetallic powder is not melted.

This invention has been described in connection with specific embodiments and examples. However, those skilled in the art will recognize various modifications and variations of which the present invention is capable without departing from its scope as represented by the appended claims.

What is claimed is:

1. A hardfacing alloy source, comprising:
 a hollow tube of metallic titanium tube material; and
 a filler powder within the hollow tube, the filler powder comprising a filler mixture of;
  an aluminum-containing alloy metallic powder comprising more than about 50 atomic percent aluminum; and
  a nonmetallic powder;
 the relative proportions of the titanium tube material, the aluminum-containing alloy metallic powder, and the nonmetallic powder being capable of forming a solid article having particles dispersed in a gamma titanium aluminide matrix.

2. The source of claim 1, wherein the metallic titanium tube material is pure titanium.

3. The source of claim 1, wherein the metallic titanium tube material is a titanium alloy.

4. The source of claim 1, wherein the aluminum-containing alloy powder comprises from about 50 to about 90 atomic percent aluminum.

5. The source of claim 1, wherein the nonmetallic powder has a composition selected from the group consisting of titanium diboride and titanium carbide.

6. The source of claim 1, wherein the nonmetallic powder is present in an amount of from about 10 to about 50 volume percent of the total of the titanium tube material, the aluminum-containing alloy, and the nonmetallic powder.

7. The source of claim 1, wherein the gamma titanium aluminide matrix has from about 42 to about 49 atomic percent aluminum.

8. A hardfacing material, comprising a mixture of
 a titanium-aluminum alloy component comprising from about 42 to about 49 atomic percent aluminum, balance titanium and other elements, wherein the titanium-aluminum alloy component comprises a metallic powder; and
 a nonmetallic powder;
 the net composition of the mixture being capable of forming a solid article having particles dispersed in a gamma titanium aluminide matrix.

9. The hardfacing material of claim 8, wherein the titanium-aluminum alloy component comprises
 a metallic powder having a composition of more than about 50 atomic percent aluminum; and
 a non-powder having a composition comprising titanium plus less than about 42 atomic percent aluminum.

10. The hardfacing material of claim 9, wherein the non-powder is in the form of a hollow tube, and the metallic powder and the nonmetallic powder are contained with in the hollow tube.

11. The hardfacing material of claim 8, wherein the nonmetallic powder has a composition selected from the group consisting of titanium diboride and titanium carbide.

12. The hardfacing material of claim 8, wherein the nonmetallic powder comprises from about 10 to about 50 volume percent of the total of the titanium-aluminum alloy component and the nonmetallic powder.

* * * * *